US007890371B2

(12) United States Patent
Chao

(10) Patent No.: US 7,890,371 B2
(45) Date of Patent: Feb. 15, 2011

(54) METHOD FOR PROCESSING TRANSACTION INFORMATION

(75) Inventor: Yuan-Ning Chao, Taipei (TW)

(73) Assignee: Trade-Van Information Services Co., Taipei (TW)

( * ) Notice: Subject to any disclaimer, the term of this patent is extended or adjusted under 35 U.S.C. 154(b) by 124 days.

(21) Appl. No.: 12/128,365

(22) Filed: May 28, 2008

(65) Prior Publication Data

US 2008/0306828 A1    Dec. 11, 2008

(30) Foreign Application Priority Data

May 28, 2007    (TW)    ................................ 96118915 A

(51) Int. Cl.
*G06Q 20/00*    (2006.01)
(52) U.S. Cl. .............................. 705/17; 705/41; 705/44; 705/64; 235/384; 380/227
(58) Field of Classification Search .................. 705/17, 705/41, 44, 64, 67; 235/384, 375; 380/227
See application file for complete search history.

(56) References Cited

U.S. PATENT DOCUMENTS 7,213,742 B1 *   5/2007   Birch et al. .................. 235/375
7,505,941 B2 *   3/2009   Bishop et al. .................. 705/67

* cited by examiner

*Primary Examiner*—Vanel Frenel
(74) *Attorney, Agent, or Firm*—WPAT, P.C.; Anthony King

(57) ABSTRACT

A method for processing transaction information is provided according to the present invention. The method enables business vender to provide consumers with paperless transaction information, e.g. invoice information, via a route mainframe and a electronic data interchange platform. The method includes providing a mobile electronic device and establishing an information service platform to connect the electronic data interchange platform, for providing the consumers a means for payment of bills; when the cash register of the business vender receives a request of the payment of bills by using the mobile electronic device, having the card reader to access balance of the electronic purse of the mobile electronic device; judging whether the balance of the electronic purse is enough for the payment of bills, if not, prohibiting the mobile electronic device from proceeding to the payment of bills, and terminating the transaction information process; if yes, then having the mobile electronic device proceed to the payment of bills and allowing the cash register to transmit, via the route mainframe and the electronic data interchange platform, transaction information received to the information service platform for saving; and transmitting at least a part of the transaction information to the mobile electronic device by the information service platform.

13 Claims, 5 Drawing Sheets

METHOD FOR PROCESSING TRANSACTION INFORMATION

BACKGROUND OF THE INVENTION

1. Field of the Invention

This invention generally relates to methods for processing transaction information, and more specifically, to a method for processing transaction information for enabling business venders to provide consumers with paperless transaction information.

2. Description of Related Art

Modern information communication speed has been enhanced dramatically due to prosperous development in computer and related network technology, and further promoting convenience of information transmission. For instance, the way electronic commerce carries out business transactions via computer network has completely changed the operation mode of global business.

The most common business-to-business electronic commerce is, for instance, electronic invoice platform retailer and business vender; as shown in FIG. 1, the retailer is, e.g. supermarket, wholesaler, convenience store, or others, while the business vender can be, e.g. product manufacturer, product importer, or others; when the retailer has a transaction demand, a retailer computer system 10 transmits an electronic order to a business vender computer system 13 via a route mainframe 11, e.g. a network apparatus, and an electronic data interchange (EDI) platform 12, thereby enabling the business vender to generate an electronic invoice corresponding to received electronic order, and then the business vender computer system 13 transmits the generated electronic invoice to the retailer computer system 12 via the EDI platform 12 and the route mainframe 11; accordingly, paperless invoice information is able to be transmitted business to business via the electronic invoice platform, thereby reducing cost of paper, fax, manpower, and time.

Since most invoices are issued according to transaction behavior of consumers, for instance, there are about eighty hundred million invoices issued to consumers annually in Taiwan vicinity, and the vast invoice amount cannot take advantage of foresaid electronic invoice platform, therefore, consumers cannot be provided with paperless invoices.

In view of the above, it is a highly urgent issue in industry of the business-to-customer electronic commerce how to enable the business to provide paperless transaction information to the customer.

SUMMARY OF THE INVENTION

In view of the disadvantages of the prior art mentioned above, it is a primary objective of the present invention to provide a method for processing transaction information, thereby enabling business venders to provide paperless transaction information to consumers, e.g. invoice information, and further lowering consumption of paper, manpower, and time for printing the transaction information.

It is another objective of the present invention to provide a method for processing transaction information, thereby enabling consumers to effectively and conveniently manage transaction information generated from transaction behavior.

To achieve the aforementioned and other objectives, a method for processing transaction information is provided according to the present invention; the method for processing transaction information is used for enabling business venders to provide consumers with paperless transaction information, e.g. invoice information, in a manner that, via a route mainframe and an electronic data interchange platform, transaction information received by cash register connecting a card reader in transmitted to the consumers. The method for processing transaction information comprises the following steps: providing a mobile electronic device and establishing an information service platform to connect the electronic data interchange platform, wherein the mobile electronic device has a built-in Subscriber Identity Module (SIM) card with a contactless Radio Frequency Identification (RFID) and an electronic purse for providing the consumer with a means of payment of bills, and the information service platform is for saving the transaction information sent from the cash register at the business vender's side via the route mainframe and the electronic data interchange platform, and for establishing a message transmission channel with the mobile electronic device via a wireless transmission processing apparatus; having the card reader access the electronic purse of the mobile electronic device to obtain a balance thereof, when the cash register at the business vender's side receives a request of payment of bills by the mobile electronic device; judging whether the balance of the electronic purse is enough for payment of bills, if not, prohibiting the mobile electronic device from proceeding to the payment of bills, and terminating the processing of the transaction information. if yes, having the mobile electronic device proceed to the payment of bills, and allowing the cash register to send, via the route mainframe and the electronic data interchange platform, the transaction information received to the information service platform for saving; followed by allowing the information service platform to send out at least a part of the transaction information to the mobile electronic device via the wireless transmission processing apparatus, and then terminating the processing of the transaction.

Furthermore, another embodiment of the method of the present invention for processing transaction information comprises the following steps: providing a memory card and establishing an information service platform to connect the electronic data interchange platform, wherein the memory card has a contactless Radio Frequency Identification (RFID) and an electronic purse for providing the consumer with a means for payment of bills, and the information service platform is configured for saving the transaction information sent from the cash register at the business vender's side via route mainframe and electronic data interchange platform; having the card reader access the electronic purse of the memory card to obtain a balance thereof, when the cash register receives a request for the payment of bills by the memory card; judging whether the balance of the electronic purse is enough for the payment of bills, if not, prohibiting the memory card from proceeding to the payment of bills and terminating the processing of the transaction information; if yes, having the memory card proceed to the payment of bills, and allowing the cash register to transmit, via the route mainframe and the electronic data interchange platform, the transaction information to the information service platform for saving, followed by allowing the cash register to transmit at least a part of the transaction information to the memory card for saving, and finally terminating the processing of the transaction information.

Compared with traditional transaction information of paper invoice, the method of the present invention for processing transaction information enables business venders to provide consumers with electronic transaction information, so as to achieve objective of paperless transaction information process.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention; those in the art can apparently understand these and other advantages and effects after reading the disclosure of this specification. The present invention can also be performed or applied by other different embodiments. The details of the specification may be on the basis of different points and applications, and numerous modifications and variations can be devised without departing from the spirit of the present invention.

Figure 1:
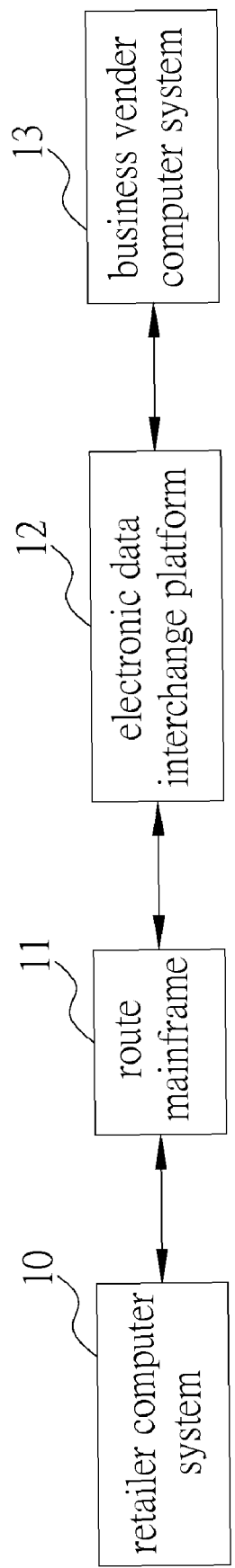
FIG. 1 is diagram illustrating a prior schematic architecture of business-to-business electronic invoice platform.
Figure 2:
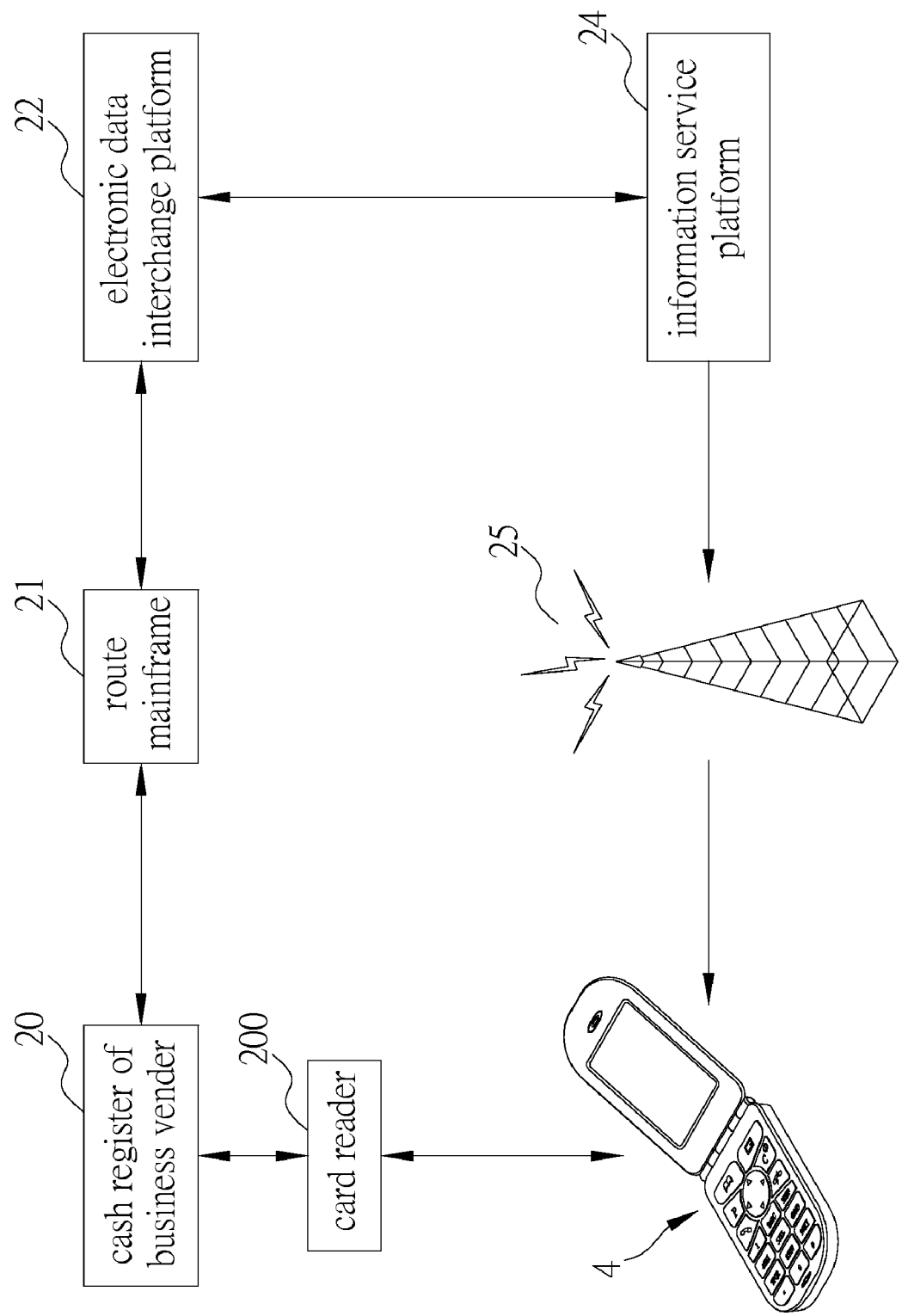
FIG. 2 is a diagram depicting a schematic architecture of a first embodiment of implementing method of the present invention for processing transaction information.

Please refer to FIG. 2, which is a diagram depicting a schematic architecture of a first embodiment of implementing the method of the present invention for processing transaction information; as shown in the FIG, to implement the first embodiment of the method of the present invention for processing transaction information, at least the following elements are required: a cash register at a business vender's side 20, a card reader 200, a route mainframe 21, an electronic data interchange (EDI) platform 22, an information service platform 24, a wireless transmission processing apparatus 25, and a mobile electronic device 4, wherein the cash register 20, the card reader 200, the route mainframe 21, the EDI platform 22, and the mobile electronic device 4 are essential hardware elements for implementing an established mobile payment mechanism of newly-target Near Field Communication (NFC) chip in the current market, and in order to simplify description and illustration, no detailed descriptions of architecture and operation of these said hardware elements are to be given hereafter. Followed are only descriptions of hardware elements related to implementation of the method of the present invention for processing transaction information.

The method of the present invention for processing transaction information is for enabling the business venders to provide consumers with paperless transaction information, e.g. invoice information, in addition to the mobile payment mechanism. It has to establish an information service platform 24 to connect the electronic data interchange platform 22, allowing the information service platform 24 to establish a message transmission channel with the mobile electronic device 4 via the wireless transmission processing apparatus 25. Therefore, when the cash register 20 accepts electronic purse provided by the mobile electronic device 4 to pay bills, the cash register at the business vender's side 20 is made to transmit, via the route mainframe 21 and the electronic data interchange platform 22, transaction information received to the information service platform 24, and then the information service platform 24 saves the transaction information. The transaction information includes related messages of, e.g. invoice number, transaction date, transaction time, location where transaction is made, store name where transaction is made, transaction items, transaction amount, and so on. In addition, the transaction information can be one of various combinations or a part of messages; in other words, a combination of the transaction information depends on content demand for consumers. If this allows the consumer or business venders to be able to inquire messages related to transaction information via the information service platform 24.

Besides, after having saved the transaction information, the information transaction platform 24 transmits at least a part of the transaction information to the mobile electronic device 4 via the wireless transmission processing apparatus 25. In another embodiment, after the at least a part of the transaction information, such as invoice information, has been transmitted to the mobile electronic device 4, whether the mobile electronic device 4 is to save the at least a part of the transaction information, is determined according to the predetermined storage setting of the mobile electronic device 4.

By implementing the method of the present invention for processing transaction information, a business vender has no need of providing consumers with traditional paper invoice, thereby achieving objective of paperless process of transaction information. Referring to FIG. 2, the mobile electronic device 4 is a mobile phone and the wireless transmission processing apparatus 25 is a Global System for Mobile (GSM), thereby enabling the information service platform 24 to transmit the at least a part of the transaction information to the mobile phone by means of text message via the Global System for Mobile. However, it has to be noted that system elements for implementing the method of the present invention for processing transaction information are not restricted to as stated herein. That is to say that an applicable systematic architecture depends on a practical implementation mode.

Furthermore, in order to prevent the transaction information from taking up too much memory space of the mobile electronic device 4, the information service platform 24 is capable of simply transmitting messages of the invoice number and the transaction amount of the transaction information to the mobile electronic device 4. Since invoice number and transaction amount take less storage space, they accordingly do not take up too much of memory space of the mobile electronic device 4. However, it should also be noted that the transaction information to be saved in the mobile electronic device 4 is not restricted as stated herein; the mobile electronic device 4 can also simply save invoice numbers of the transaction information. The memory unit of the mobile electronic device 4 can be, for instance, a SIM card or a built-in memory. At the time that a consumer has any inquiry for more detailed transaction information, the consumer can resort to the information service platform 24 for further inquiry, e.g. inquiring invoice message.

Figure 3:
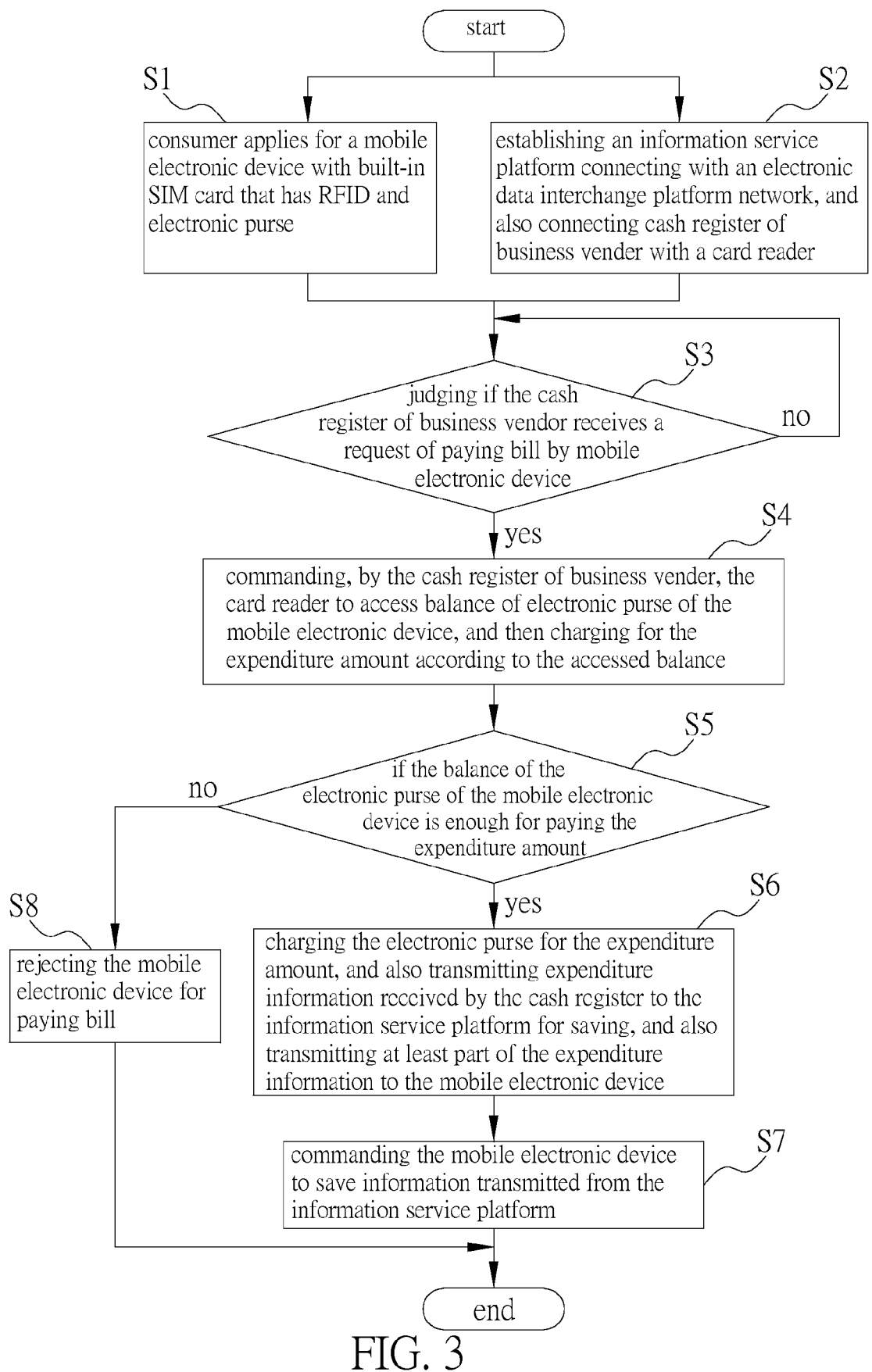
FIG. 3 is an operational flowchart depicting the first embodiment of the method of the present invention for processing transaction information.

Please refer to FIG. 3, which is an operational flowchart depicting the first embodiment of the method of the present invention for processing transaction information. As shown in the drawing, the method of the present invention may either proceed from step S1 or step S2. If step S1 is to be started first, a consumer has to first apply for a mobile electronic device having a built-in Subscriber Identity Module (SIM) card comprising a contactless Radio Frequency Identification (RFID) and an electronic purse. The electronic purse provided by the mobile electronic device allows the consumer to implement the payment of bills. Then, proceeding to step S3.

If step S2 is to proceed first, an information service platform is established to connect the electronic data interchange platform network for saving the transaction information sent from the cash register at a business vender's side via the route mainframe and the electronic data interchange platform. Further, the information service platform is allowed to establish a message transmission channel with the mobile electronic device via the wireless transmission processing apparatus. In addition, the cash register at the business vender's side is to be connected with a card reader. Then, proceeding to step S3.

In step S3, the cash register at the business vender's side judges whether a request for the payment of bills is received by a mobile electronic device; if no, step S3 is repeated; if yes, step S4 is to be proceeded.

In step S4, the card reader connected to the cash register at the business vender's side is ordered by the cash register to access the electronic purse of the mobile electronic device so as to obtained a balance of the electronic purse. Then, proceeding to step S5.

In step S5, the cash register at the business vender's side judges whether the obtained balance of the electronic purse of the mobile electronic device is enough for the payment of bills. If no, the method proceeds to step S8; if yes, then the method proceeds to step S6.

In step S6, the mobile electronic device proceeds to the payment of bills by charging the transaction amount of the bills to the electronic purse. It in turn makes the cash register transmit received transaction information, via the route mainframe and the electronic data interchange platform, to the information service platform for saving; the information service platform is also allowed to transmit at least a part of the transaction information to the mobile electronic device via the wireless transmission processing apparatus. The at least a part of the transaction information is a message of an invoice number, a transaction date, a transaction time, a location where the transaction is made, a store name where the transaction is made, a transaction item, a transaction amount and so on. The content of the message can be preset according to the memory size provided by the mobile electronic device; in other words, transmission of the demanded message depends on the implementation mode. Then, proceeding to step S7.

In step S7, the mobile electronic device saves information transmitted from the information service platform, and then terminating the processing of the transaction information. In another embodiment, after the at least a part of the transaction information has been transmitted to the mobile electronic device, whether the at least a part of the transaction information is to be saved in the mobile electronic device, is determined according to a predetermined storage setting of the mobile electronic device. In other words, the mobile electronic device is capable of deciding whether to save the at least a part of the transaction information. In practice, the consumer of the mobile electronic device is allowed to set up the mobile electronic device for deciding if the transaction information is to be saved. Accordingly, with electronic transaction information provided by the business vender and setting of the mobile electronic device for deciding whether to save transaction information, the consumer is provided with a more efficient means of managing personal transaction information, such as invoice message or transaction amount.

In step S8, since the cash register at the business vender's side has judged that the balance of the electronic purse of the mobile electronic device is not enough for the payment of bills, the mobile electronic device is prohibited from proceeding to the payment of bills, and the processing of the transaction information is accordingly terminated.

Figure 4:
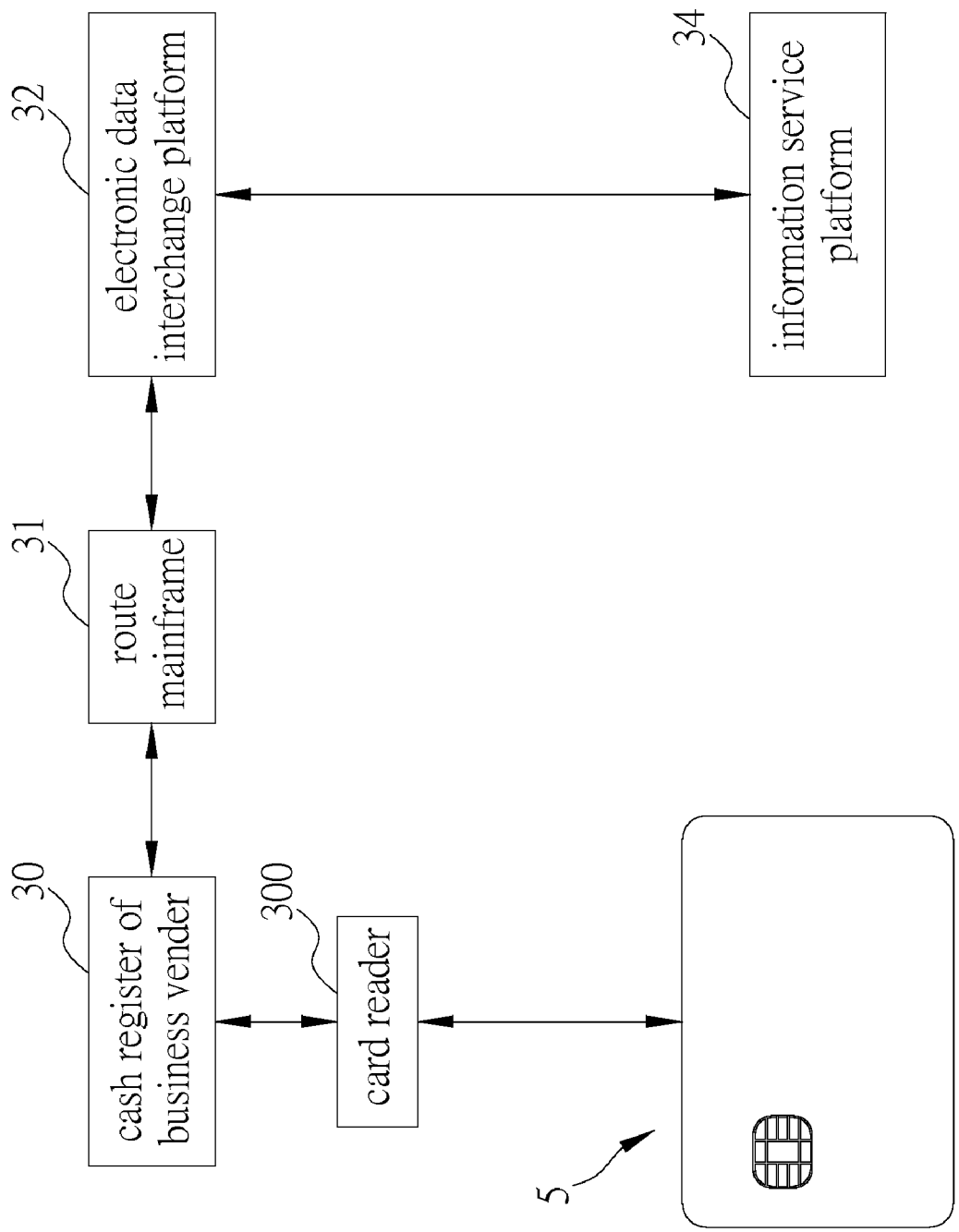
FIG. 4 is a diagram depicting a schematic architecture of a second embodiment of implementing the method of the present invention for processing transaction information.

Please refer to FIG. 4, which is a diagram depicting a schematic architecture of a second embodiment of implementing the method of the present invention for processing transaction information. As shown in the drawing, to implement the second embodiment of the method of the present invention for processing transaction information: a cash register at a business vender's side 30, a card reader 300, a route mainframe 31, an electronic data interchange (EDI) platform 32, an information service platform 34, and a memory card 5 are required. The memory card 5 can be, e.g. a stored value card, a bank card, a credit card, or a micro mobile payment (MMP) purse card. Further, the cash register 30, the card reader 300 connected to the cash register 30, the route mainframe 31, the EDI platform 32, and the memory card 5 are essential hardware elements for implementing an established micro mobile payment mechanism of ISO14443 standard card in the current market. In order to simplify description and illustration, no detailed descriptions of architecture and operation of these hardware elements are to be given hereafter. Followed are only descriptions of hardware elements related to implementation of the method of the present invention for processing transaction information.

The method for processing transaction information of the present embodiment is used for enabling business venders to provide consumers with paperless transaction information. In addition to the requirement for the establishment of micro mobile payment mechanism of ISO14443 standard card, the method has to establish an information service platform 34 to connect the electronic data interchange platform 32. By such, when the cash register 30 accepts the electronic purse provided by the memory card 5 from a consumer for the payment of bills, the cash register 30 transmits received transaction information, via the route mainframe 31 and the electronic data interchange platform 32, to the information service platform 24, and the information service platform 24 saves the transaction information, wherein the transaction information includes messages e.g. invoice numbers, a transaction date, a transaction time, a location where the transaction is made, a store name where the transaction is made, a transaction item, a transaction amount, and so on. Different transaction information can be formed by combinations of the messages; in other words, different messages can be collected and combined according to the demand for the content of the transaction information. Therefore, consumers or business venders are able to inquire messages related to the transaction information via the information service platform 24. Furthermore, after the cash register at the business vendor's side 30 accepts the consumers to pay bills by using the electronic purse provided by the memory card 5, the cash register 30 writes at least a part of the received transaction information to the memory card 5 via the card reader 300. Accordingly, the method for processing transaction information is used for enabling business venders to provide consumers with paperless transaction information without traditional paper invoices, thereby achieving objective of paperless transaction information process.

The same reason as that in the first embodiment. In order to prevent the transaction information from taking up too much memory space of the memory card 5, the cash register can only transmit the messages of the invoice number and the transaction amount to the memory card 5 for saving since they do not take up too much memory space of the memory card 5. However, it should be noted that the transaction information to be saved in the memory card 5 is not limited to those as stated herein. The memory card 5 can also simply save the invoice number of the transaction information. If a consumer has any inquiry for more detailed transaction information, the consumer can go to the information service platform 34 for further inquiry.

Figure 5:
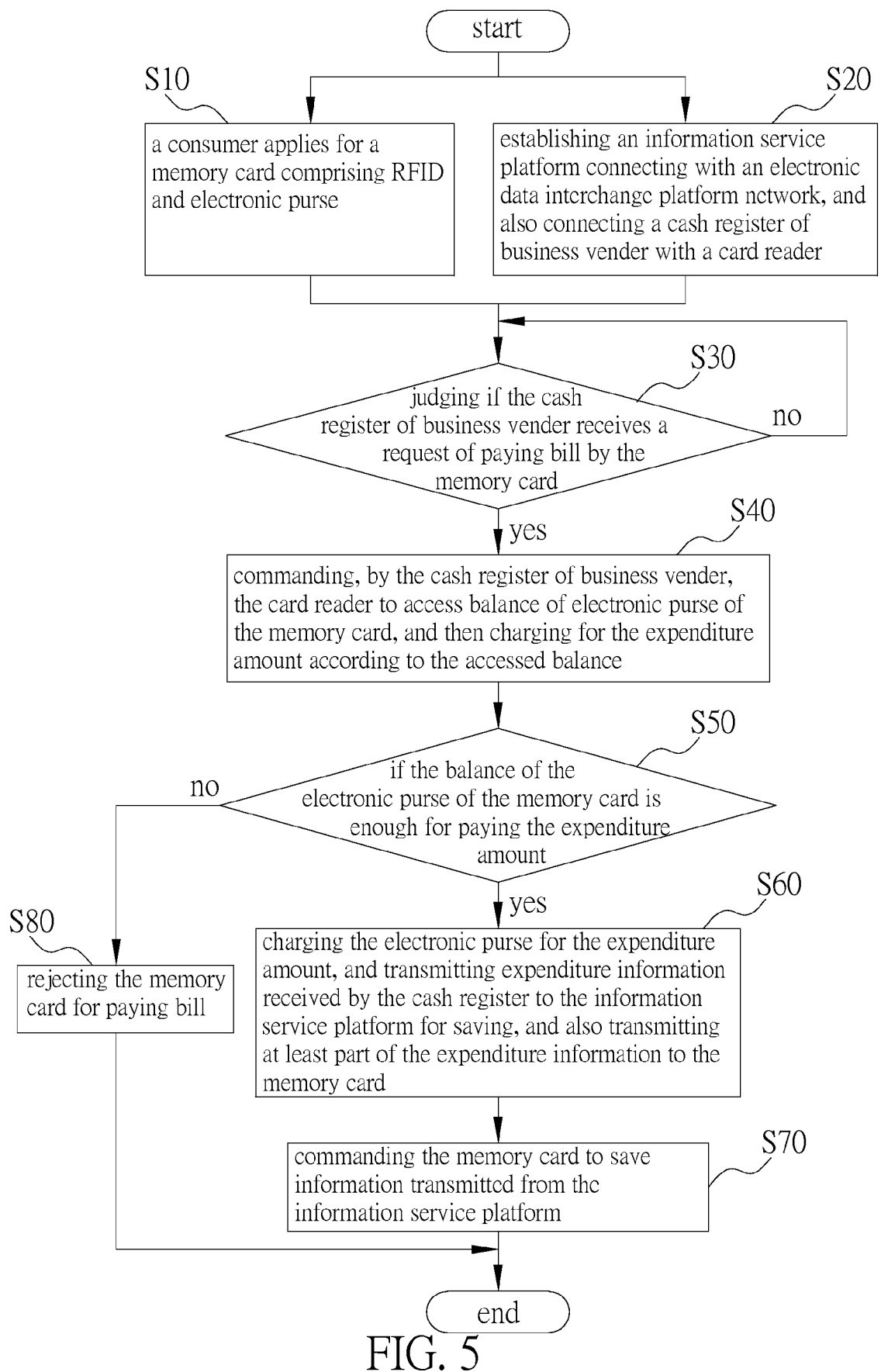
FIG. 5 is an operational flowchart depicting the second embodiment of the method of the present invention for processing transaction information.

Please refer to FIG. 5, which is an operational flowchart depicting the second embodiment of the method of the present invention for processing transaction information. As shown in the drawing, the method of the present invention may either proceed from step S10 or step S20. If step S10 is to be started first, a consumer has to first apply for a memory card having a contactless Radio Frequency Identification (RFID) and an electronic purse. The electronic purse provided by the mobile electronic device allows the consumer to implement the payment of bills. Then, proceeding to step S30. If step S20 is to proceed first, an information service platform is established to connect the electronic data interchange platform network for saving the transaction information sent from the cash register at a business vender's side via the route mainframe and the electronic data interchange platform. In addition, the cash register at the business vender's side is to be connected with a card reader. Then, proceeding to step S30.

In step S30, the cash register at the business vender's side judges whether a request for the payment of bills is received by a mobile electronic device; if no, step S30 is repeated; if yes, step S40 is to be proceeded.

In step S40, the card reader connected to the cash register at the business vender's side is ordered by the cash register to access the electronic purse of the memory card so as to obtained a balance of the electronic purse. Then, proceeding to step S50.

In step S50, the cash register at the business vender's side judges whether the obtained balance of the electronic purse of the memory card is enough for the payment of bills. If no, the method proceeds to step S8; if yes, then the method proceeds to step S60.

In step S60, the memory card proceeds to the payment of bills by charging the transaction amount of the bills to the electronic purse. It in turn makes the cash register transmit received transaction information, via the route mainframe and the electronic data interchange platform, to the information service platform for saving, and at least a part of the cash register transmit received transaction information is transmitted to the memory card via the card reader. Then, proceeding to step S70.

In step S70, the memory card saves at least a part of the transaction information, and then terminating the processing of the transaction information.

In step S80, since the cash register at the business vender's side has judged that the balance of the electronic purse of the memory card is not enough for the payment of bills, the memory card is prohibited from proceeding to the payment of bills, and the processing of the transaction information is accordingly terminated.

In view of the above, the method of the present invention for processing transaction information is capable of enabling business vendors to provide paperless invoice to consumer, and consumers can also obtain or save transaction information such as the invoice information and so on at the time of transaction by using a portable equipment. Compared with traditional paper invoice, the present invention not only provides business vendosr with advantages of reducing consumption of invoice papers, invoice printing, labors, time, etc., but also provides consumers with advantages of preventing transaction information from being lost while using paper invoice. Furthermore, since invoice information is saved as a format of electronic information in equipments such as foresaid mobile electronic devices, memory cards, or information service platforms, it is advantageous for consumers to manage invoice and transaction situations.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A method for processing invoice information, which is capable of enabling business venders to provide consumers with paperless invoice information, in a manner that, via a route mainframe and an electronic data interchange platform, the invoice information received by a cash register connected with a card reader at the business vender's side is transmitted out to the consumers; the method for processing invoice information comprising the steps of:

providing a mobile electronic device and establishing an information service platform to connect the electronic data interchange platform, wherein the mobile electronic device is a Subscriber Identity Module (SIM) card with built-in Radio Frequency Identification (RFID) and electronic purse for providing the consumers with a means for payment of bills, and the information service platform is configured for saving invoice information sent from the cash register at the business vender's side via the route mainframe and the electronic data interchange platform, and for establishing a message transmission channel with the mobile electronic device via a wireless transmission processing apparatus;

having the card reader connected with the cash register access the electronic purse of the electronic mobile device to obtain a balance thereof, when the cash register at the business vender's side receives a request of the payment of bills by using the mobile electronic device;

judging whether the balance of the electronic purse is enough for the payment of bills; if no, prohibiting the mobile electronic device from proceeding to the payment of bills and terminating the processing of the invoice information; if yes, allowing the mobile electronic device to proceed with the payment of bills in terms of the balance of the electronic purse, and then having the cash register transmit the invoice information, via the route mainframe and the electronic data interchange platform, to the information service platform for saving, followed by allowing the information service platform to transmit the invoice information to the mobile electronic device via the wireless transmission processing apparatus; and terminating the processing of the invoice information.

2. The method for processing invoice information of claim 1, wherein the invoice information saved in the information service platform includes at least one of an assembly of an invoice number, a transaction date, a transaction time, a place where a transaction is made, a store name where a transaction is made, a transaction item, and a transaction amount.

3. The method for processing invoice information of claim 2, wherein the invoice information is subject to the invoice number.

4. The method for processing invoice information of claim 2, wherein the invoice information is subject to the invoice number and the transaction amount.

5. The method for processing invoice information of claim 1, wherein after the invoice information is transmitted to the mobile electronic device, the mobile electronic device saves the transmitted invoice information.

6. The method for processing invoice information of claim 5, wherein the mobile electronic device saves the transmitted invoice information in the Subscriber Identity Module card or a built-in memory.

7. The method for processing invoice information of claim 1, wherein the mobile electronic device is selected from the group consisting of a mobile phone, a personal digital assistant (PDA), and a notebook computer.

8. The method for processing invoice information of claim 1, wherein the mobile electronic device is a mobile phone, and the wireless transmission processing apparatus is a Global system for Mobile (GSM), so as to enable the information service platform to transmit the invoice information to the mobile phone by means of instant text via the Global System for Mobile.

9. A method for processing invoice information, which is capable of enabling business venders to provide consumers with paperless invoice information, in a manner that, via a route mainframe and an electronic data interchange platform, the invoice information received by a cash register connecting a card reader at the business vender's side is transmitted out to the consumers; the method for processing invoice information comprising the steps of:

providing a memory card and establishing an information service platform to connect the electronic data interchange platform, wherein the memory card has a contactless Radio Frequency Identification (RFID) and an electronic purse for providing the consumers with a means for payment of bills, and the information service platform is for saving the invoice information sent from the cash register at the business vender's side via the route mainframe and the electronic data interchange platform;

having the card reader connected with the cash register access the electronic purse of the memory card to obtain a balance thereof, when the cash register receives a request of payment of bills by using the mobile electronic device; and judging whether the balance of the electronic purse is enough for the payment of bills; if no, prohibiting the memory card from proceeding to the payment of bills, and terminating the processing of the invoice information; if yes, allowing the memory card to proceed to the payment of bills in terms of the balance of the electronic purse, and then having the cash register transmit the invoice information, via the route mainframe and the electronic data interchange platform, to the information service platform for saving, followed by allowing the cash register to transmit the invoice information to the memory card for saving; and terminating the processing of the invoice information.

10. The method for processing invoice information of claim 9, wherein the invoice information saved in the information service platform includes at least one of an assembly of an invoice number, a transaction date, a transaction time, a place where transaction is made, a store name where transaction is made, a transaction item, and a transaction amount.

11. The method for processing invoice information of claim 10, wherein the invoice information is subject to the invoice number.

12. The method for processing invoice information of claim 10, wherein the invoice information is subject to the invoice number and transaction amount.

13. The method for processing invoice information of claim 9, wherein the memory card is selected from the group consisting of a stored value card, bankcard, credit card, and micro mobile payment (MMP) purse card.

\* \* \* \* \*